United States Patent [19]

Williams

[11] Patent Number: 4,897,447
[45] Date of Patent: Jan. 30, 1990

[54] THERMOPLASTIC COMPOSITIONS AND IMPACT MODIFIERS FOR SAME

[75] Inventor: William G. Williams, Baton Rouge, La.

[73] Assignee: Copolymer Rubber & Chemical Corp., Baton Rouge, La.

[21] Appl. No.: 138,662

[22] Filed: Dec. 28, 1987

[51] Int. Cl.$^4$ .................. C08L 23/16; C08L 51/04; C08L 63/10
[52] U.S. Cl. .................................. 525/66; 525/64; 525/67; 525/68; 525/74; 525/75; 525/78; 525/80
[58] Field of Search ................ 525/64, 66, 67, 68, 525/74, 75, 78, 80

[56] References Cited

U.S. PATENT DOCUMENTS

| | | | |
|---|---|---|---|
| 4,081,424 | 5/1978 | Gergen et al. | 525/93 |
| 4,172,859 | 10/1979 | Epstein | 525/109 |
| 4,174,358 | 11/1979 | Epstein | 525/184 |
| 4,696,972 | 9/1987 | Bourland | 525/68 |
| 4,753,986 | 6/1988 | Wang | 525/64 |

Primary Examiner—Allan M. Lieberman
Attorney, Agent, or Firm—Rockey and Rifkin

[57] ABSTRACT

A thermoplastic molding composition and modifier for improving the impact strength and toughness thereof in which the modifier is the combination of (1) an EPM or EPDM rubber grafted with an alpha-beta unsaturated dicarboxylic acid or anhydride or an epoxy functional alpha-beta ethylenically unsaturated hydrocarbon and (2) an epoxy acrylate oligomer of bisphenol A.

14 Claims, No Drawings

THERMOPLASTIC COMPOSITIONS AND IMPACT MODIFIERS FOR SAME

This invention relates to impact modifiers for thermoplastic resins and it relates more particularly to impact modifiers of the type described which enable retention of surface smoothness and appearance of the thermoplastic resins with which such modifiers are blended or otherwise incorporated.

BACKGROUND OF THE INVENTION

Common thermoplastic resins, i.e., polycarbonates, polyesters, polyphenylene ethers, polyamides, polystyrenes, acrylics and the like have excellent combinations of properties making them suitable for use as molded articles. Such resins, in general, show good elongation, good tensile strength and good impact, among other properties. However, it is widely recognized that such resins are notch sensitive and subject to brittle failure upon impact due to poor resistance to crack propagation. This flaw is an otherwise excellent spectrum of physical properties greatly restricts the usefulness of articles molded from such resins.

Improving the notch sensitivity and preventing brittle failure upon impact of thermoplastic resins has been the subject matter of considerable research and development. Generally, the problem is addressed by the addition or admixture of additives to the thermoplastic resin which improve notch sensitivity without substantially affecting other properties. The most common type of such additives are rubber-like or elastomeric materials, such as ethylene-propylene copolymers (EPM), or ethylene-propylene-polyene terpolymers (EPDM), which form discrete particles dispersed throughout the thermoplastic resin. However, the desired level of improvement has not been achieved with the addition of such rubber-like or elastomeric materials by reason of the relative incompatibility between such rubber-like or elastomeric materials and many thermoplastic resins.

Attempts have been made to overcome this problem and increase the compatibility between the rubber-like or elastomeric materials or elastomeric resins by modification of the rubber-like or elastomeric materials to provide such with sites that adhere to the thermoplastic resin and thus increase compatibility.

Cope, U.S. Pat. No. 3,435,093, discloses blends of polyethylene terephthalate and an ionic hydrocarbon copolymer of alpha-olefins of the formula $R-CH=CH_2$ in which R is hydrogen (ethylene) or an alkyl radical of 1-3 carbon atoms (propylene-pentene) with the copolymer modified with an alpha-beta ethylenically unsaturated carboxylic acid containing 3-5 carbon atoms. The Cope patent does not teach or suggest the components of the additive employed in the practice of the invention described and claimed herein, as will hereinafter appear.

The problem was faced directly in the Epstein U.S. Pat. Nos. 4,172,859 and 4,174,358. The Epstein patents are somewhat confusing in that they seek to cover the waterfront by listing an endless number of materials and combinations thereof for use as additives to improve the toughness and impact strength of polyamide, polyester and polycarbonate resins. In the Epstein patents, stress is placed on the particle size and tensile modulus of the copolymer additive. While Epstein contemplates the use of ethylene-propylene copolymers and ethylene-propylene-polyene terpolymers from amongst the large number of other varieties of materials and the use of alpha-beta ethylenically unsaturated carboxylic and dicarboxylic acids and anhydrides as modifying agents to provide sites which adhere to the matrix resin, the Epstein patents do not recognize the concepts of the invention described and claimed herein, as will be pointed out.

In the copending application Ser. No. 858,890, of which this is an improvement, the invention described therein is based on the thought that an ethylene, $C_3-C_{16}$ mono-olefin, polyene and preferably an ethylene, propylene, diene rubbery interpolymer would make a good impact modifier for such thermoplastic polyester, polyamide, polycarbonate resins if the two could be made compatible. The two are relatively incompatible because the rubber is a hydrocarbon while the thermoplastic or polyester is a much more polar substance. Thus, the objective of the invention described and claimed therein was addressed to the modification of the ethylene, mono-olefin, polyene interpolymer rubber greatly to improve its compatibility with polyester to provide an improved impact modifier for the thermoplastic polyester resin.

Briefly described, the features of the invention of the copending application are embodied in a composition comprising 60-90 percent by weight of the matrix thermoplastic resin, such as in the form of a polyester, blended with 10-40 percent by weight of an unsaturated rubber formed by copolymerization of ethylene, one or more mono-olefins and one or more polyenes in which the backbone unsaturated rubber component has been modified with an ester of an, unsaturated acid having an epoxide functionality on the alkoxy portion, such as the ester derived from methacrylic acid and an epoxy alcohol and which attaches to the backbone rubber chiefly by way of a grafting reaction with little if any cross-linking reaction.

Copending Phadke application Ser. No. 800,332, filed Nov. 21, 1985 describes an improvement over the invention described and claimed in the aforementioned copending application Ser. No. 858,890, in that controlled cross-linking of the rubber backbone phase (EPDM) of the grafted modifier provides a significant improvement in the knitline strength of the final blend with the matrix (polyester, polycarbonate or polyamide) resin, when the cross-linking reaction is carried out after proper dispersion of the grafted rubber phase in the plastic matrix resin and when the cross-linking is concentrated between the rubber phase of the cross-linking agent in the form of a compound having functionalities capable of reaction with the grafted rubber, such as diacids or corresponding dianhydrides and/or diamines such as hexamethylene diamine (HDA), malamine, benzophenone tetracarboxylic dianhydride, adipic acid, maleic acid, maleic anhydride and the like.

While the desired improvements in impact strength, toughness and knitline strength have been achieved by blending a described thermoplastic matrix resin with modifiers of the types described in the aforementioned copending applications, the final products formed thereof, as by molding and the like, could be further improved from the standpoint of internal appearance and surface characteristics.

In my copending application, Ser. No. 037,416 filed Apr. 13, 1987, the invention described therein comprises a grafted EPM or EPDM rubber modified with a reactive polystyrene for use as an impact modifier for thermoplastic resins. The polystyrene modified matrix resins have improved notched impact strength and toughness, and also an improved appearance due to enhanced compatibility between the EPM or EPDM rubber and the thermoplastic resins. The resins most noticeably improved by the addition of the reactive polystyrene include polycarbonates, polyphenylene ethers and polystyrenes.

BRIEF DESCRIPTION OF THE INVENTION

It has been found, in accordance with the practice of this invention, that the internal appearance and the surface characteristics of the products fabricated from the compositions of the above-mentioned applications are improved, when, in addition to the grafted EPM or EPDM rubber, the modifier for the matrix resin includes an epoxy acrylate terminated oligomer of bisphenol A, marketed by the Sartomer Company of Westchester, Pa. under the name Chemlink 3000 (CL3K).

More specifically, the plastic compositions embodying the features of this invention comprise 70-90 parts by weight matrix resin to 30-10 parts by weight modifier and in which the modifier comprises 59-93 parts by weight grafted EPM or EPDM rubber to 7-41 parts by weight CL3K.

The matrix resins that are noticeably benefitted by the practice of this invention are the polycarbonate resins. As described in the above-mentioned copending applications, the grafted rubbers comprise EPM rubbers, formed by copolymerization of ethylene with one or more $C_3$-$C_{16}$ mono-olefins and preferably propylene, grafted with an alpha-beta unsaturated dicarboxylic acid such as maleic acid, maleic anhydride or the like described in the aforementioned copending applications and as more specifically described in the U.S. patent to Olivier, U.S. Pat. No. 4,594,386, or an EPDM rubber grafted with an unsaturated dicarboxylic acid of the type heretofore described and preferably, an alpha-beta ethylenically unsaturated hydrocarbon, preferably having an epoxide functionality, as described in the aforementioned copending applications Ser. Nos. 800,332 and 858,890.

As the EPM rubber, use can be made of an ethylene-mono-olefin and preferably an ethylene-propylene copolymer rubber formed by copolymerization in solvent solution, in the presence of a Ziegler-type catalyst, of ethylene and one or more mono-olefins, preferably propylene, but which may include 1-butene, 1-pentene, or other mono-olefins having 3-12 carbon atoms. The ratio of ethylene to propylene or $C_3$-$C_{12}$ mono-olefin may range from 10-95 moles of ethylene to 90-5 moles of propylene or other mono-olefins. The preferred range of ethylene to propylene or other mono-olefin is 45-75 moles of ethylene to 55-25 moles of propylene or other mono-olefin.

The solvent medium in which the copolymerization reaction is carried out may be any suitable inert organic solvent that is liquid under reaction conditions and it may be a prior art solvent for solution polymerization of mono-olefin in the presence of a Ziegler-type catalyst. Examples of satisfactory hydrocarbon solvents include straight chain paraffins having from 5-8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5-6 carbon atoms in the ring nucleus. The solvent selected may be a mixture of one or more of the foregoing hydrocarbons and preferably a mixture of aliphatic and napthenic hydrocarbons having approximately the same boiling range as normal hexane. It is desirable that the solvent be dry and free of substances that will interfere with the Zeigler-type catalyst used in the polymerization reaction.

Zeigler catalysts of the type well known to the prior art may be used. Such Ziegler-type catalysts are disclosed in large numbers of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff period system of elements, such as titanium, vanadium and chromium halides with an organo-metallic compound of a metal of Groups I, II or III of the Mendeleeff period system which contains at least one carbon-metal bond, such as trialkyl aluminum, and alkyl aluminum halides in which the alkyl groups contain from 1-20 and preferably 1-4 carbon atoms.

The preferred Ziegler catalyst for interpolymerization is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups I, II and III for the aluminum compounds. A catalyst prepared from alkyl aluminum sesquichloride, such as methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator. When expressed on the basis of RSV, withdrawal is carried out when the desired molecular weight has been reached, such as a polymer having an RSV within the range of 0.4-5.0 and preferably 1.5-3.0. RSV is the reduced solution viscosity of a 0.1 percent solution in decalin at 135° C.

As the component reacted onto the EPM rubbery copolymer, it is preferred to make use of maleic anhydride but other unsaturated dicarboxylic acid anhydrides or acids may be used having the general formula:

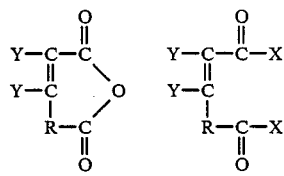

in which R is an alkylene group having from 0–4 carbon atoms and Y is preferably hydrogen but may be an organic group such as a branched or straight chain alkyl group, an anhydride, ketone, heterocyclic or other organic group of 1–12 carbon atoms, a halogen group such as chlorine, bromine, or iodine and in which at least one, and preferably both of the X groups are hydroxyl but in which one of the X groups may be an ester forming group such as an alkoxy or aryloxy group having from 1–8 carbon atoms.

For example, the maleic anhydride in the following examples may be substituted in whole or in part with equal molecular equivalents of other unsaturated dicarboxylic acids or anhydrides, such as itaconic acid or anhydride, fumaric acid, maleic acid and the like.

The reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumene hydroperoxide, t-butylperbenzoate, 2,5-dimethyl-2,5-di(t-butylperoxy) hexane, or other free radical source capable of hydrogen abstraction, as represented by alkyl peroxy esters, alkyl peroxides, alkyl hydroperoxides, diacylperoxides and the like, which is added with the EPM, reactive agent and polyamide, in bulk, to the reaction chamber.

The desired results are achieved when the amount of anhydride or diacid reacted, at least in part, by way of a grafting reaction onto the EPM polymer is within the range of 0.2–5 percent by weight of the base polymer and preferably in an amount within the range of 0.5–4 percent by weight. In general, the amount reacted onto the polymer will represent only about 30–80 percent of the material introduced into the reaction.

As the EPDM backbone rubber component, it is preferred to make use of an EPDM formed by interpolymerization of ethylene, one or more mono-olefins having from 3–16 carbon atoms, preferably propylene, and one or more polyenes. In the practice of this invention, the EPDM component of the composition can be substituted in whole or in part by an EPM rubber.

In the preparation of the EPDM interpolymer rubber, the polyene monomer containing a plurality of carbon-to-carbon double bonds may be selected from those disclosed in the prior art for use as third monomers in the preparation of ethylene-mono-olefin-polyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo (2,2,1) heptane wherein at least one double bond is present in one of the bridged rings, such as dicylopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isobutylidene-2-norbornene, 5-n-butylidene-2-norbornene, dicyclopenta-dienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene.

The EPDM backbone rubber may contain chemically bound therein molar ratios of ethylene to propylene or other $C_3$–$C_{16}$ mono-olefin varying between 95:10 to 5:90 ethylene:propylene, and preferably between 70:30 to 55:45 ethylene:propylene. The polyene or substituted polyene may be chemically bound therein in an amount of 0.1 to 10 mole percent, and preferably 0.3 to 10 mole percent. The level of unsaturation in the backbone rubber may range from 0–20 double bonds per 1,000 carbon atoms in the polymer chain.

The interpolymerization is carried out in the presence of a Ziegler catalyst of the type heretofore described.

The preparation of EPM or EPDM polymers is well known and is fully described in such patents as U.S. Pat. Nos. 2,933,480, 3,093,621, 3,211,709, 3,646,168, 3,790,519, 3,884,993, 3,894,999 and 4,059,654, amongst many others.

As the ester of a methacrylic acid which has an epoxide functionality on the alkoxy portion, it is preferred to make use of glycidyl methacrylate, although other epoxy compounds having the following general formula may be used:

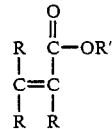

in which R′ is an organic group having an epoxide functionality and R is hydrogen, methyl, ethyl, propyl or other alkyl, aralkyl, cyclic, or aromatic group. Representative of such other modifying agents are glycidyl acrylate, glycidyl 2-ethylacrylate, glycidyl 2-propylacrylate and the like.

The desired results are achieved when the amount of epoxide component charged is within the range of 2–15 parts by weight per 100 parts by weight of the backbone rubber.

A free radical initiator, such as dialkyl peroxide may be used to promote the graft reaction. Such initiator is generally used in an amount within the range of 1–5 parts by weight per 100 parts by weight of the EPM or EPDM rubber, and preferably in an amount within the range of 1–2 percent by weight of the rubber.

The grafting reaction may be carried out in solvent solution with the rubber backbone present in a concentration which may range from 10-30 percent by weight, with constant stirring, at an elevated temperature within the range of 125°-200° C. for a time ranging from ½ to 2 hours. The reaction condition can be varied depending somewhat upon the type and amount of catalyst and temperature conditions, as is well known to those skilled in the art. Where high amounts of graft monomer are to be attached to the backbone rubber, it has been found to be advantageous to carry out the graft reaction in the melt state of the backbone rubber, i.e. extruder grafting. This process is simply performed by feeding the backbone rubber, an excess of graft monomer, and an appropriate catalyst to a melt extruder and mixing and reacting the feed components at an elevated temperature.

The Chemlink 3000 for use herein may be characterized by the following structural formula:

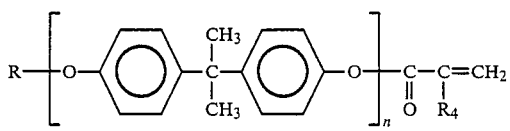

Where R is an organic group having an epoxide functionality; $R_4$ is hydrogen or a methyl group, and n is an integer from 1 to about 20.

It is believed that the improvement of the present invention is derived from a reaction between the Chemlink 3000 and the grafted rubber to provide a new and novel modifier which is subsequently blended with the matrix resin, as by means of an extruder, bamburg, hot rolling mill or the like melt processing equipment. The precise reaction between the Chemlink 3000 and the grafted rubber is not known. Nor is it known whether the Chemlink 3000 reacts with the graft portion of the grafted rubber or the base rubber. What is known, however, is that a grafted rubber is necessary to achieve the improvement of the present invention and that the addition of Chemlink 3000 to a non-grafted rubber does not result in an impact modifier which improves the impact strength and toughness of thermoplastic resins.

Suitable polycarbonate resin for use herein may be prepared by reacting a dihydric phenol with a carbonate precursor, such as phosgene, haloformate or a carbonate ester. Typically, such polycarbonate will have recurring structural units of the formula:

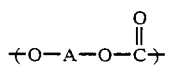

wherein A is a divalent aromatic radical of the dihydric phenol employed in the polymer producing reaction. Preferably, the aromatic carbonate polymers have an intrinsic viscosity ranging from 0.30 to 1.0 dl./g (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols are bisphenols joined by an alkylene radical, an ether link, or a sulfur link. Preferred bisphenols include
2,2-bis-(4-hydroxyphenyl)propane;
2,2-bis-(3,5-dimethyl-4-hydroxphenyl)propane;
4,4'-dihydroxy-diphenyl ether;
bis(2-hydroxphenyl)methane; mixtures thereof and the like.

The preferred aromatic carbonate polymer for use herein is a homopolymer derived from 2,2-bis(4-hydroxyphenyl)propane, i.e. bisphenol-A.

Polycarbonates suitable for use herein, including methods of polymerization, and a further disclosure of monomer constituents, are described in U.S. Pat. Nos. 2,999,835; 3,028,365; 3,334,154; 4,131,575; 4,018,750; and 4,123,436 which are incorporated herein by reference.

The elastomeric containing molding compositions of this invention may be used alone as molding pellets or mixed with other polymers, and may contain fillers such as glass fibers, mica, and the like, as well as pigments, dyes, stabilizers, plasticizers, and the like. One may readily determine which are necessary and suitable for a particular application.

Having described the basic concepts of the invention, illustration will now be made by way of the following examples.

EXAMPLE 1

Preparation of maleic anhydride graft of EPM rubber.

A 2.75 RSV, 60/40 (molar ratio) ethylene-propylene EPM rubber (EP Syn 7006), marketed by Copolymer Rubber & Chemical Corporation of Baton Rouge, La.) was fed with a screw feeder (of K-TRON CORPORATION) into a co-rotating twin extruder (Werner-Pfleiderer Corporation ZSK 30) (12 barrels) at a rate of 6.0 pounds per hour. The temperature was 200° C. in all zones. A solution containing maleic anhydride/acetone/2,5-dimethyl-2,5 di(t-butylperoxy) hexane (DBPH) in a wt/wt/wt ratio of 2/1/0.1 was fed at a rate of 0.224 pounds per hour. This rate corresponds to a maleic anhydride level of 2.4 parts by weight per 100 parts by weight of rubber (phr) and a DBPH level of 0.12 phr. Acetone and unreacted maleic anhydride were evaporated off by applying a vacuum through a vent in the barrel and subsequently condensed. The extrudate was cooled in a water bath and pelletized. The dried pellets had a degree of graft (DOG) of 1.7 percent and an RSV of 1.56. The RSV of the base rubber (EPM) and the grafted polymer rubber, were measured on 0.1% solution in decalin at 135° C.

The grafting reaction can be carried out in solvent solution as well as by bulk reaction, as heretofore described.

EXAMPLE 2

Preparation of glycidyl methacrylte grafted EPDM rubber.

100 parts by weight backbone rubber (2.2 RSV; 9 C═C per 1000 carbon atoms, 8 percent by weight 5-ethylidine-2-norbornene, ethylene/propylene ratio of 2/1, Mooney Viscosity=40, marketed by Copolymer Rubber & Chemical Corporation under the name EPSYN 4906); 0.1 parts by weight antioxidant (Irganox 1076 phenolic antioxidant marketed by Ciba Geigy Corporation) and 300 parts by weight hexane were charged to a one gallon Hastellog C reactor. The reactor was sealed, flushed with nitrogen and heated to 155° C. 2.5 parts by weight glycidyl methacrylate in 15 parts by weight hexane were pressured into the reactor, after which 2 parts by weight initiator (Hercules Di-Cup T free radical initiator) in 15 parts by weight hexane was added. The solution was stirred at 500–600 RPM for one hour at 155° C. and 200–250 psig. When the reaction mixture cooled down, the product was recovered by precipitation in acetone and dried. The grafted EPDM had 2.6 percent bound glycidyl/methacrylate (GMA), an RSV of 2.44 and was substantially gel free.

In the following example, illustrating the practice of this invention, modifiers embodying the features of the invention were prepared using a 10–30% solution of CL3K and grafted rubber in a 1 or 5 gallon sealed reactor, with stirring. The temperature was varied from 90°–155° C. and the reaction time was varied from 1–3 hours. The product was recovered by coagulation with acetone. The resulting modifier was then air dried overnight in an oven at 70°–100° C.

Blends of thermoplastic polycarbonate resin and modifier were prepared using 2–3 extrusions through a 1" single screw extruder (Killion) having an L/D ratio of 20/1. Temperatures used for extrusion were 450° F. in the barrel and 425° F. at the die. The extruded strands were air cooled and chopped into pellets. The pellets were molded into test specimens for tensile and notched Izod impact strengths, using a plunger injection molder with a cavity temperature of 570°–615° F. and a mold temperature of 250°–315° F. The test specimens were stored in moisture proof polyethylene bags for at least 16 hours before testing.

The specimens were subjected to the following tests:

| The specimens were subjected to the following tests: | |
|---|---|
| (1) | Notched Izod impact strength was measured according to ASTM D256. |
| (2) | Tensile strength was measured according to ASTM D638. |
| (3) | Extrusion Plastometer flow rate was measured according to ASTM D1238. |
| (4) | Flexural properties were measured according to ASTM D790. |
| (5) | Blend quality ratings (BQR) were assigned on the basis of surface appearance and internal appearance (MWO-8-83, WGW-20-86). |
| (6) | Unless otherwise stated the polycarbonate used was Lexan 141 (GE). |

EXAMPLE 3

This example illustrates the combination of a modifier formed of maleic anhydride grafted EPM and Chemlink 3000 blended with thermoplastic polycarbonate matrix resin.

The total amount of modifier in the final blend was varied from 10% to 20%. The amount of Chemlink 3000 in the final blend varied from 1.4% to 3%. The amount of grafted rubber in the blend varied from 10% to 20%.

The room temperature notched Izod for these blends were 9.1 to 11.7 ft-lbs/inch. The low temperature notched Izod (−20° C.) were 3.6 to 9.6 ft-lbs/inch. By comparison, the polycarbonate resin without modifier gave values of less than 2 ft-lbs/inch.

Blends formed of the polycarbonate resin and grafted rubber gave poor surface characteristics and poor internal appearance, characterized by a layered, plywood type structure. On the other hand, with blends formed with the modifier combination which includes the Chemlink 3000 with the grafted rubber, higher rubber loadings can be achieved with less degradation of appearance.

By way of a specific example, the modifier was prepared with 26 grams Chemlink 3000 and 150 grams maleic anhydride grafted EPM (5006) containing a degree of graft of 0.64 percent.

65 grams of modifier were dry mixed with 260 grams polycarbonate resin, yielding a blend of 20% by weight modifier (3% Chemlink 3000 and 17% rubber) and 80% polycarbonate.

The room temperature notched Izod was 9.1 ft-lbs/inch and the cold temperature notched Izod was 3.6. The blend quality rating was B2.

EXAMPLE 4

This example illustrates the use of modifier formed of EPDM rubber grafted with glycidyl methacrylate and Chemlink 3000.

The total amount of modifier in the final blend was varied from 10%–30%. The amount of Chemlink 3000 in the final blend was varied from 0%–8.2%. The amount of grafted rubber in the final blend was varied from 8.5%–25.5%. The degree of graft of the rubber was 3%.

The room temperature Izod Impact (RTNI) values for these blends were 4.3–9.2 ft-lbs/inch. The −20° C. NI values were 1.9–2.9 ft-lbs/inch. The blend quality ratings were B3-A1.5, with most being A2 or higher. Blends rated ranged from 3.5/2.5–2/1 with 1.0/1.0 being perfect.

The modifier was prepared using 520 g of Chemlink 3000 and 3000 of glycidyl methacrylate grafted rubber having a degree of graft of 3.0%.

Pellets of this modifier (35 g) were dry mixed with the polycarbonate (315 g) and extruded twice. This resulted in a blend consisting of 10% modifier (1.5% Chemlink 3000, 8.5% rubber) and 90% polycarbonate. The RTNI was 7.4 ft-lbs/inch and the −20° C. NI was 1.9 ft-lbs/inch. The blend quality rating was 2/1.

It will be understood that changes may be made in the details of the formulations and processing characteristics, without departing from the spirit of the invention, especially as defined by the following claims.

What is claimed is:

1. A modifier for improving the impact strength and toughness of thermoplastic matrix resins comprising
   (1) an EPM or EPDM rubber grafted with
      (a) 2–15 percent by weight of the rubber of an epoxy functional alpha-beta ethylenically unsaturated compound characterized by the general formula:

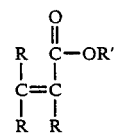

in which R' is an organic group having an epoxide functionally and each R is hydrogen, alkyl, aralkyl, cyclic, or aromatic group, or
      (b) 0.2–5 percent by eight of the rubber of an alpha-beta unsaturated dicarboxylic acid or anhydride characterized by the general formula:

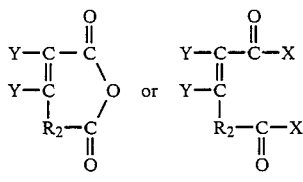

in which $R_2$ is an alkalene group having from 0-4 carbon atoms, Y is selected from the group consisting of hydrogen, halogen, or an organic group having from 1-12 carbon atoms and X is hydroxyl or ester forming group but in which at least one X is hydroxyl, and (2) a biphenol A oligomer having terminal epoxy and acrylate groups having to general formula:

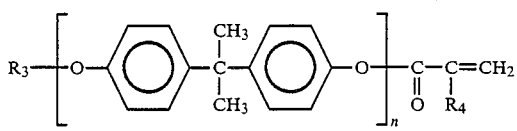

in which $R_3$ is an organic group having an epoxide functionality; $R_4$ is hydrogen or a methyl group; and n is an integer from 1 to about 20.

2. The modifier of claim 1 in which the epoxy functional alpha-beta ethylenically unsaturated hydrocarbon is glycidyl acrylate or glycidyl methacrylate.

3. A modifier as claimed in claim 1, in which the alpha-beta unsaturated dicarboxylic acid or anhydride is maleic acid or maleic anhydride.

4. A thermoplastic molding composition comprising 70-90 parts by weight of (A) a continuous phase of a thermoplastic matrix resin and 30-10 parts by weight of (B) a modifier composition formed of 59-93 parts by weight of (1) an EPM or EPDM rubber grafted with (a) 2-15 percent by weight of the rubber of any epoxy functional alpha-beta ethylenically unsaturated compound having the following general formula:

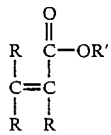

in which R' is an organic group having an epoxide functionality and R is hydrogen, alkyl, aralkyl, cyclic, or aromatic group or (b) 0.2-5 percent by weight of the rubber of an alpha-beta unsaturated dicarboxylic acid or anhydride having the following general formula:

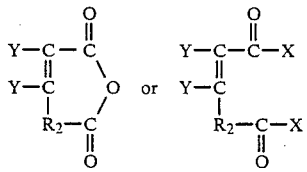

in which $R_2$ is an alkylene group having from 0-4 carbon atoms, Y is selected from the group consisting of hydrogen, halogen, or an organic group having from 1-12 carbon atoms and X is a hydroxyl or ester forming group but in which at least one X is a hydroxyl, and 7-41 parts by weight of (2) an epoxy acrylate oligomer of bisphenol A having the following general formula:

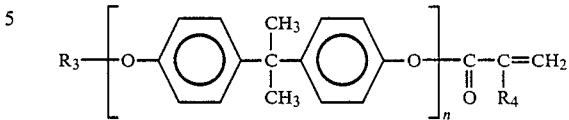

in which $R_3$ is an organic group having an epoxide functionality; $R_4$ is hydrogen or a methyl group; and n is an integer from 1 to about 20.

5. The thermoplastic molding composition as claimed in claim 4, in which the thermoplastic matrix resin is selected from the group consisting of polyesters, polycarbonates, polyphenylene, oxides, polyamides, polystryenes, and acrylics.

6. The thermoplastic molding composition, as claimed in claim 4, in which the epoxy functional alpha-beta ethylically unsaturated hydrocarbon is selected from the group consisting of an epoxy functional alk-1-ene or substituted alk-1-ene of up to 10 carbon atoms, acrylic acid and an alkyl acrylic acid.

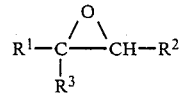

wherein $R^3$ is hydrogen or methyl; $R^2$ is hydrogen or alkyl of from one to about six carbon atoms; and $R^1$ is alkylene having one to ten carbon atoms.

7. The thermoplastic molding composition as claimed in claim 4, in which the epoxy functional alpha-beta ethylenically unsaturated hydrocarbon is selected from the group consisting of glycidyl acrylate and glycidyl methacrylate.

8. The thermoplastic molding composition, as claimed in claim 4, in which the unsaturated dicarboxylic grafting agent is maleic anhydride.

9. The thermoplastic molding composition as claimed in claim 4, in which the EPM rubber is a copolymer of ethylene and one or more $C_3$-$C_{16}$ mono-olefins.

10. The thermoplastic molding composition as claimed in claim 9, in which the EPM rubber is a copolymer of 10-95 moles ethylene and 90-5 moles propylene.

11. The thermoplastic molding composition, as claimed in claim 4, in which the EPDM rubber is an interpolymer of ethylene, a $C_3$-$C_{16}$ mono-olefin and a polyene.

12. The thermoplastic molding composition, as claimed in claim 11, in which the EPDM rubber is an interpolymer of 95-100 parts by weight ethylene, 5-90 parts by weight propylene and 0.1-10 parts by weight 5-ethylidene-2-norbornene.

13. The method of producing a thermoplastic molding composition, as claimed in claim 4, comprising blending the thermoplastic matrix resin with the modifier composition.

14. The method of producing a thermoplastic molding composition, as claimed in claim 4, comprising blending in a hot melt processing equipment the thermoplastic matrix resin, the grafted rubber and the epoxy acrylate oligomer of bisphenol A.

* * * * *

UNITED STATES PATENT AND TRADEMARK OFFICE
CERTIFICATE OF CORRECTION

PATENT NO. : 4,897,447
DATED : January 30, 1990
INVENTOR(S) : William G. Williams It is certified that error appears in the above—identified patent and that said Letters Patent is hereby corrected as shown below:

Column 11, Line 14, insert -- a -- before hydroxyl;

Column 11, Line 16, change "biphenol" to -- bisphenol --;

Column 11, Line 16, change "to" to -- the --;

Column 11, Line 68, delete "a" before hydroxyl;

Column 12, delete lines 26-33; and

Column 12, Line 55, change "95-100" to -- 95-10 --.

Signed and Sealed this

Eleventh Day of December, 1990

Attest:

HARRY F. MANBECK, JR.

*Attesting Officer*  *Commissioner of Patents and Trademarks*